US011843415B2

(12) United States Patent
Asada

(10) Patent No.: US 11,843,415 B2
(45) Date of Patent: Dec. 12, 2023

(54) SUBMARINE OPTICAL COMMUNICATION SYSTEM, METHOD FOR TRANSMITTING MONITORING RESULT, AND NON-TRANSITORY COMPUTER READABLE MEDIUM STORING MONITORING PROGRAM

(71) Applicant: NEC Corporation, Tokyo (JP)

(72) Inventor: Hideo Asada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/640,130

(22) PCT Filed: May 14, 2020

(86) PCT No.: PCT/JP2020/019217
§ 371 (c)(1),
(2) Date: Mar. 3, 2022

(87) PCT Pub. No.: WO2021/049099
PCT Pub. Date: Mar. 18, 2021

(65) Prior Publication Data
US 2022/0303001 A1  Sep. 22, 2022

(30) Foreign Application Priority Data
Sep. 10, 2019  (JP) .................................. 2019-164280

(51) Int. Cl.
*H04B 10/077* (2013.01)
*H04B 13/02* (2006.01)

(52) U.S. Cl.
CPC ........... *H04B 10/077* (2013.01); *H04B 13/02* (2013.01)

(58) Field of Classification Search
None
See application file for complete search history.

(56) References Cited

U.S. PATENT DOCUMENTS

| 6,344,915 B1* | 2/2002 | Alexander ......... H04B 10/0771 398/115 |
| 2003/0011855 A1* | 1/2003 | Fujiwara ............ H04B 10/0777 398/177 |

(Continued)

FOREIGN PATENT DOCUMENTS

| CN | 101636940 A | 1/2010 |
| JP | H09-18410 A | 1/1997 |

(Continued)

OTHER PUBLICATIONS

International Search Report for PCT Application No. PCTIJP2020/019217, dated Jul. 28, 2020.

(Continued)

*Primary Examiner* — David W Lambert

(57) ABSTRACT

A submarine optical communication system includes a first submarine device and a second submarine device. The first submarine device includes a first monitoring circuit for monitoring an operation state of the first submarine device and a first optical signal adjusting circuit for adjusting an intensity of an optical signal in a first wavelength band based on a first monitoring result obtained by the first monitoring circuit and outputting the adjusted optical signal as an optical signal including the first monitoring result. The second submarine device includes a second monitoring circuit for monitoring an operation state of the second submarine device and a second optical signal adjusting circuit for adjusting an intensity of an optical signal in a second wavelength band based on a second monitoring result obtained by the first monitoring circuit and outputting the adjusted optical signal as an optical signal including the second monitoring result.

13 Claims, 5 Drawing Sheets

(56) References Cited

U.S. PATENT DOCUMENTS

| | | |
|---|---|---|
| 2003/0911855 | 1/2003 | Fujiwara |
| 2012/0106947 A1* | 5/2012 | Wang .................. H04B 10/032 398/9 |
| 2017/0126326 A1 | 5/2017 | Aida |
| 2019/0190603 A1 | 6/2019 | Asada |

FOREIGN PATENT DOCUMENTS

| | | |
|---|---|---|
| JP | 2000-028479 A | 1/2000 |
| JP | 2003-032192 A | 1/2003 |
| JP | 2014-197788 A | 10/2014 |
| WO | 2010/107017 A1 | 9/2010 |
| WO | 2015/145985 A1 | 10/2015 |
| WO | 2018/003912 A1 | 1/2018 |

OTHER PUBLICATIONS

CN Office Action for CN Application No. 202080063298.4, dated Sep. 26, 2023 with English Translation.

\* cited by examiner

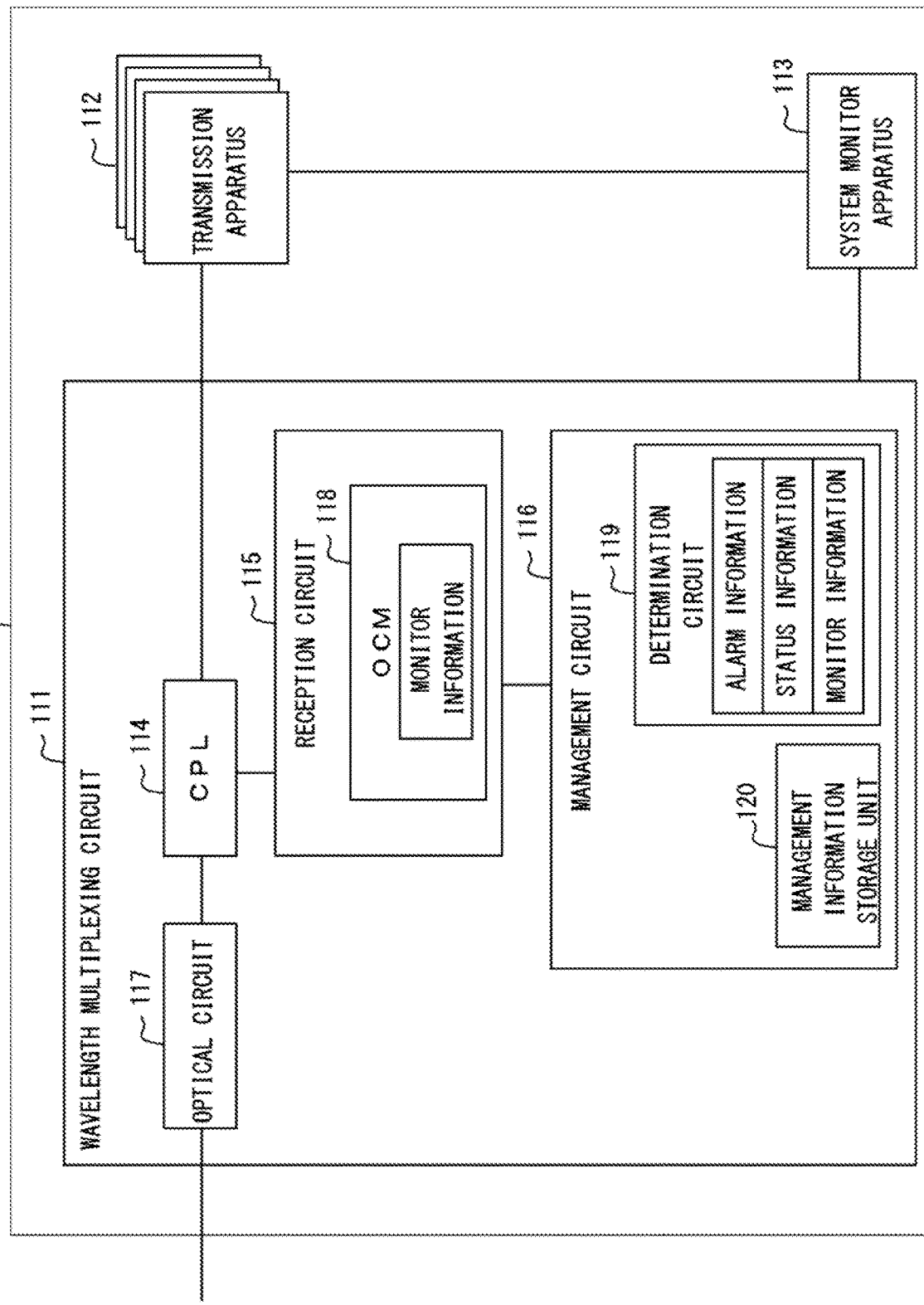

SUBMARINE OPTICAL COMMUNICATION SYSTEM, METHOD FOR TRANSMITTING MONITORING RESULT, AND NON-TRANSITORY COMPUTER READABLE MEDIUM STORING MONITORING PROGRAM

This application is a National Stage Entry of PCT/JP2020/019217 filed on May 14, 2020, which claims priority from Japanese Patent Application 2019-164280 filed on Sep. 10, 2019, the contents of all of which are incorporated herein by reference, in their entirety.

TECHNICAL FIELD

The present disclosure relates to a submarine optical communication system and a method of transmitting a monitoring result.

BACKGROUND ART

The submarine optical communication system includes a plurality of terminal station apparatuses provided on land, a submarine cable for transmitting communication between the plurality of terminal station apparatuses, and a submarine device provided at a relay point of the submarine cable. The submarine device transmits, relays, and splits optical signals propagating through the submarine cable.

In order to improve reliability, the submarine device monitors an operation state of itself, and transmits a result of the monitoring to one of a plurality of the terminal station apparatuses having a function of managing the monitoring results among the plurality of terminal station apparatuses provided on land.

Techniques related to a submarine optical communication system and a method of transmitting the monitoring results of the submarine device provided in the submarine optical communication system are disclosed in, for example, Patent Literature 1, 2, and 3.

In Patent Literature 1 and 2, a terminal station apparatus transmits a command signal to a relay apparatus to be monitored, and in response to receiving the command signal, the relay apparatus to be monitored transmits a monitoring result of the relay apparatus itself to the terminal station apparatus as a response signal.

Further, in Patent Literature 3, the relay apparatus includes optical receiving means for receiving a wavelength-multiplexed optical signal, and processing means for selecting an optical signal in a first wavelength from the wavelength-multiplexed optical signal, performing intensity modulation according to notification information, returning the intensity-modulated optical signal back to the wavelength-multiplexed optical signal, and outputting the wavelength-multiplexed optical signal. In this manner, the relay apparatus can output a monitoring optical signal (a monitoring result of the relay apparatus itself) without having a light source for the monitoring optical signal.

CITATION LIST

Patent Literature

Patent Literature 1: Japanese Unexamined Patent Application Publication No. H09-18410
Patent Literature 2: International Patent Publication No. WO2018/003912
Patent Literature 3: International Patent Publication No. WO2015/145985

SUMMARY OF INVENTION

Technical Problem

However, in the related art, when there are a plurality of relay apparatuses (submarine devices) to be monitored, no consideration has been given to a case in which the plurality of relay apparatuses simultaneously transmit the monitoring results to the terminal station apparatus.

For example, in the configurations of Patent Literature 1 and 2, the terminal station apparatus transmits a command signal to the relay apparatus to be monitored, and in response to receiving the command signal, the relay apparatus to be monitored transmits the monitoring result of the relay apparatus itself to the terminal station apparatus as a response signal. Therefore, in the configurations of Patent Literature 1 and 2, when there are a plurality of relay apparatuses to be monitored, it is necessary that the terminal station apparatus sequentially accesses each of the plurality of relay apparatuses to sequentially acquire the monitoring result of each of the plurality of relay apparatuses. In other words, it is necessary for each relay apparatus to transmit the monitoring result of the relay apparatus itself to the terminal station apparatus when the monitoring result is not transmitted by the other relay apparatuses. Specifically, in the configurations of Patent Literature 1 and 2, when there are a plurality of relay apparatuses to be monitored, the plurality of relay apparatuses cannot simultaneously transmit the monitoring results to the terminal station apparatus.

Further, in Patent Literature 3, a relay apparatus is merely configured to be able to adjust a modulation intensity of an optical signal in a designated wavelength for the purpose of outputting a monitoring optical signal (a monitoring result of the relay apparatus) without including a light source for the monitoring optical signal in the relay apparatus. In other words, in Patent Literature 3, no consideration has been given to a case in which a plurality of relay apparatuses simultaneously transmit the monitoring results to the terminal station apparatus. Therefore, in the configuration disclosed in Patent Literature 3, when there are a plurality of relay apparatuses to be monitored, it is necessary for each relay apparatus to transmit the monitoring result of the relay apparatus itself when the monitoring results are not transmitted by the other relay apparatuses so that the transmission of the monitoring result does not collide with the transmission of the monitoring results by the other relay apparatuses. That is, in the configuration of Patent Literature 3, when there are a plurality of relay apparatuses to be monitored, the plurality of relay apparatuses cannot simultaneously transmit the monitoring results to the terminal station apparatus.

Further, in Patent Literature 3, since an optically complicated circuit configuration is adopted in which a response signal light wavelength is split and extracted from a reception main signal by using a filter, modulated by VOA, and then multiplexed, there is a possibility that a main signal may be degraded. Additionally, this configuration require a dedicated circuit for light intensity modulation for a response. Further, since the optical wavelength used for the response cannot be changed in each splitter or repeater after the operation is started, a system including many optical branch apparatuses cannot support dynamic optical path changes. An amount of information that can be transmitted from each branch or repeater is also limited to binary information.

In short, in the related art, when there are a plurality of relay apparatuses (submarine devices) to be monitored, there is a problem that the plurality of relay apparatuses cannot freely transmit the monitoring results to the terminal station apparatus without worrying about each other's transmission state of the monitoring result.

An object of the present disclosure is to provide a submarine optical communication system and a method of transmitting a monitoring result that solve the above problems.

Solution to Problem

An example aspect is a submarine optical communication system including: a plurality of terminal station apparatuses; a submarine cable configured to transmit optical signals used for communication between the plurality of terminal station apparatuses; and a first submarine device and a second submarine device provided at relay points of the submarine cable. The first submarine device includes: a first monitoring circuit configured to monitor an operation state of the first submarine device; and a first optical signal adjusting circuit configured to adjust an intensity of an optical signal in a first wavelength band assigned to the first submarine device among the optical signals supplied to the first submarine device based on a first monitoring result obtained by the first monitoring circuit and output the adjusted optical signal as an optical signal including the first monitoring result. The second submarine device includes: a second monitoring circuit configured to monitor an operation state of the second submarine device; and a second optical signal adjusting circuit configured to adjust an intensity of an optical signal in a second wavelength band assigned to the second submarine device among the optical signals supplied to the second submarine device based on a second monitoring result obtained by the second monitoring circuit and output the adjusted optical signal as an optical signal including the second monitoring result, the second wavelength band being different from the first wavelength band assigned to the first submarine device.

In another example aspect, a method of transmitting a monitoring result including: a first monitoring step of monitoring, in a first submarine device, an operation state of the first submarine device; a second monitoring step of monitoring, in a second submarine device, an operation state of the second submarine device; a first optical signal adjusting step of adjusting, in the first submarine device, an intensity of an optical signal in a first wavelength band assigned to the first submarine device among optical signals supplied to the first submarine device based on a first monitoring result obtained in the first monitoring step and outputting the adjusted optical signal as an optical signal including the first monitoring result; and a second optical signal adjusting step of adjusting, in the second submarine device, an intensity of an optical signal in a second wavelength band assigned to the second submarine device among the optical signals supplied to the second submarine device based on a second monitoring result obtained in the second monitoring step and outputting the adjusted optical signal as an optical signal including the second monitoring result, the second wavelength band being different from the first wavelength band assigned to the first submarine device.

Advantageous Effects of Invention

According to the above example aspects, it is possible to provide a submarine optical communication system in which each of a plurality of submarine devices can freely transmit a monitoring result of the submarine device itself without worrying about each other's transmission state of a monitoring result, and a method of transmitting the monitoring result.

BRIEF DESCRIPTION OF DRAWINGS

FIG. 8 is a block diagram showing a specific configuration example of a terminal station apparatus provided in the submarine optical communication system shown in FIG. 1.

DESCRIPTION OF EMBODIMENT

An example embodiment will be described below with reference to the drawings. Since the drawings are simple, the technical scope of the example embodiment should not be narrowly interpreted based on the description of the drawings. The same elements are denoted by the same reference signs, and repeated descriptions are omitted.

The disclosure will be described by dividing it into a plurality of sections or example embodiment whenever circumstances require it for convenience in the following embodiment.

However, unless otherwise particularly specified, these sections or embodiment are not irrelevant to one another. One section or example embodiment is related to modified example, applications, details, supplementary explanations, and the like of some or all of the other ones. When reference is made to the number of elements or the like (including the number of pieces, numerical values, quantity, range, etc.) in the following example embodiment, the number thereof is not limited to a specific number and may be greater than or less than or equal to the specific number unless otherwise particularly specified and definitely limited to the specific number in principle.

Further, in the following example embodiment, components (including operation steps, etc.) are not always essential unless otherwise particularly specified and considered to be definitely essential in principle. Similarly, when reference is made to the shapes, positional relations, or the like of the components or the like in the following example embodiment, they will include ones, for example, substantially approximate or similar in their shapes or the like unless otherwise particularly specified and considered not to be definitely so in principle. This is similarly applied even to the above-described number or the like (including the number of pieces, numerical values, quantity, range, etc.).

First Example Embodiment

Figure 1:
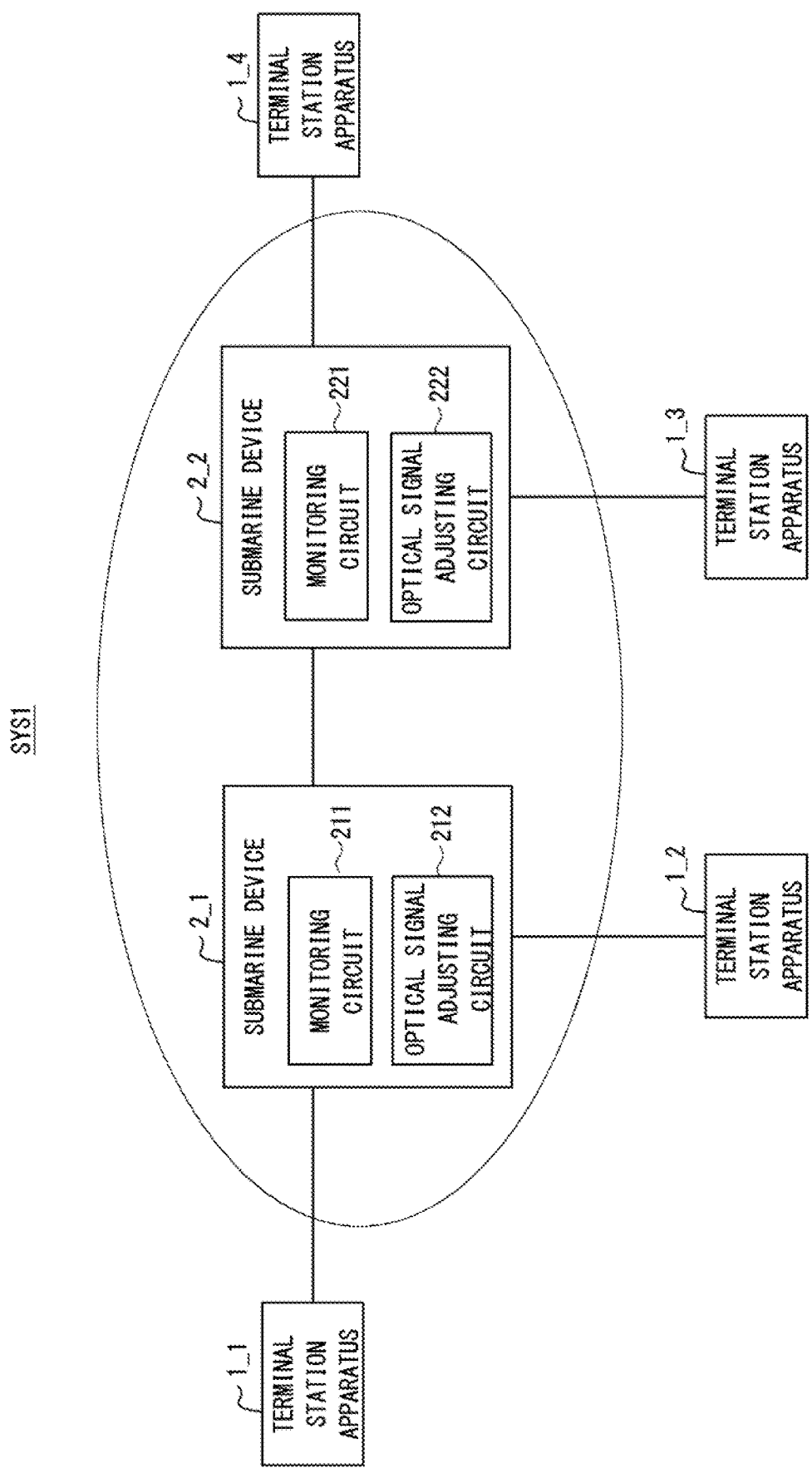
FIG. 1 is a block diagram schematically showing a submarine optical communication system according to a first example embodiment.

FIG. 1 is a block diagram schematically showing a submarine optical communication system SYS1 according to a first example embodiment. As shown in FIG. 1, the submarine optical communication system SYS1 includes a plurality (four in the example of FIG. 1) of terminal station apparatuses 1, a plurality (two in the example of FIG. 1) of submarine devices 2, and submarine cables 3. In the example of FIG. 1, in order to distinguish the four terminal station apparatuses, the terminal station apparatuses 1 are referred to as terminal station apparatuses 1_1 to 1_4, respectively. Further, in order to distinguish the two submarine devices 2, the submarine devices 2 are referred to as submarine devices 2_1 and 2_2, respectively.

The terminal station apparatuses 1_1 to 1_4 are provided on land and are configured to communicate with each other through the submarine cables 3. At least one of the terminal station apparatuses 1_1 to 1_4 has a function of collecting results of monitoring the submarine devices 2_1 and 2_2 performed by the submarine devices 2_1 and 2_2, respectively, and managing and controlling the monitoring results.

Each of the submarine cables 3 transmits optical signals used for communication between the terminal station apparatuses 1_1 to 1_4. Each of the submarine devices 2_1 and 2_2 is provided at a relay point (on the bottom of the sea) of the submarine cable 3, and transmits, relays, and splits the optical signals propagating through the submarine cable 3.

A monitoring circuit 211 monitors an operation state of the submarine device 2_1. Specifically, the submarine device 2_1 includes at least the monitoring circuit 211 and an optical signal adjusting circuit 212. The optical signal adjusting circuit 212 adjusts an intensity of the optical signal in a wavelength band (a first wavelength band) assigned to the submarine device 2_1 among the optical signals (wavelength multiplexed optical signals) supplied to the submarine device 2_1 through the submarine cable 3, based on the monitoring result obtained by the monitoring circuit 211. Then, the optical signal adjusting circuit 212 outputs the adjusted optical signal as an optical signal including the monitoring result obtained by the monitoring circuit 211. This optical signal including the monitoring result obtained by the monitoring circuit 211 is transmitted through the submarine cable 3 to the terminal station apparatus (e.g., the terminal station apparatus 1_1) for managing and controlling the monitoring result of the submarine device 2_1.

Similarly, a monitoring circuit 221 monitors an operation state of the submarine device 2_2. Specifically, the submarine device 2_2 includes at least the monitoring circuit 221 and an optical signal adjusting circuit 222. The optical signal adjusting circuit 222 adjusts an intensity of the optical signal in a wavelength band (a second wavelength band) assigned to the submarine device 2_2 among the optical signals (wavelength multiplexed optical signals) supplied to the submarine device 2_2 through the submarine cable 3, based on the monitoring result obtained by the monitoring circuit 221. Note that the wavelength band of the optical signal assigned to the submarine device 2_2 is different from the wavelength band of the optical signal assigned to the submarine device 2_1. Then, the optical signal adjusting circuit 222 outputs the adjusted optical signal as an optical signal including the monitoring result obtained by the monitoring circuit 221. This optical signal including the monitoring result obtained by the monitoring circuit 221 is transmitted through the submarine cable 3 to the terminal station apparatus (e.g., the terminal station apparatus 1_1) for managing and controlling the monitoring results of the submarine device 2_2.

As described above, in the submarine optical communication system SYS1 according to this example embodiment, a plurality of submarine devices adjust the intensities of the optical signals in different wavelength bands included in common optical signals based on each of the monitoring results, and output the optical signals including the monitoring results, respectively. Thus, in the submarine optical communication system SYS1 according to this example embodiment, each of the plurality of submarine devices can freely transmit the monitoring result of the submarine device itself without worrying about each other's transmission state of the monitoring result. It is thus possible, for example, for the plurality of submarine devices to simultaneously transmit the respective monitoring results to the terminal station apparatus. Further, for example, when a failure occurs in any of the submarine devices, each of the submarine devices can autonomously transmit the monitoring result to the terminal station apparatus without waiting for a command signal from the terminal station apparatus. Furthermore, in this configuration, the configuration and assignment of the light wavelength and the like used for a response can be changed after the operation is started.

Next, the details of the submarine device 2_1 and the terminal station apparatus 1_1 will be described. Note that the submarine device 2_2 has basically the same configuration as that of the submarine device 2_1 except that the wavelength band assigned to the submarine device 2_2 for transmitting the monitoring result is different from that assigned to the submarine device 2_1. Therefore, the description of the submarine device 2_2 will be omitted. The terminal station apparatuses 1_2 to 1_4 have basically the same configuration as that of the terminal station apparatus 1_1, and therefore, a description thereof will be omitted.

Specific Example of Submarine Device 2_1

Figure 2:
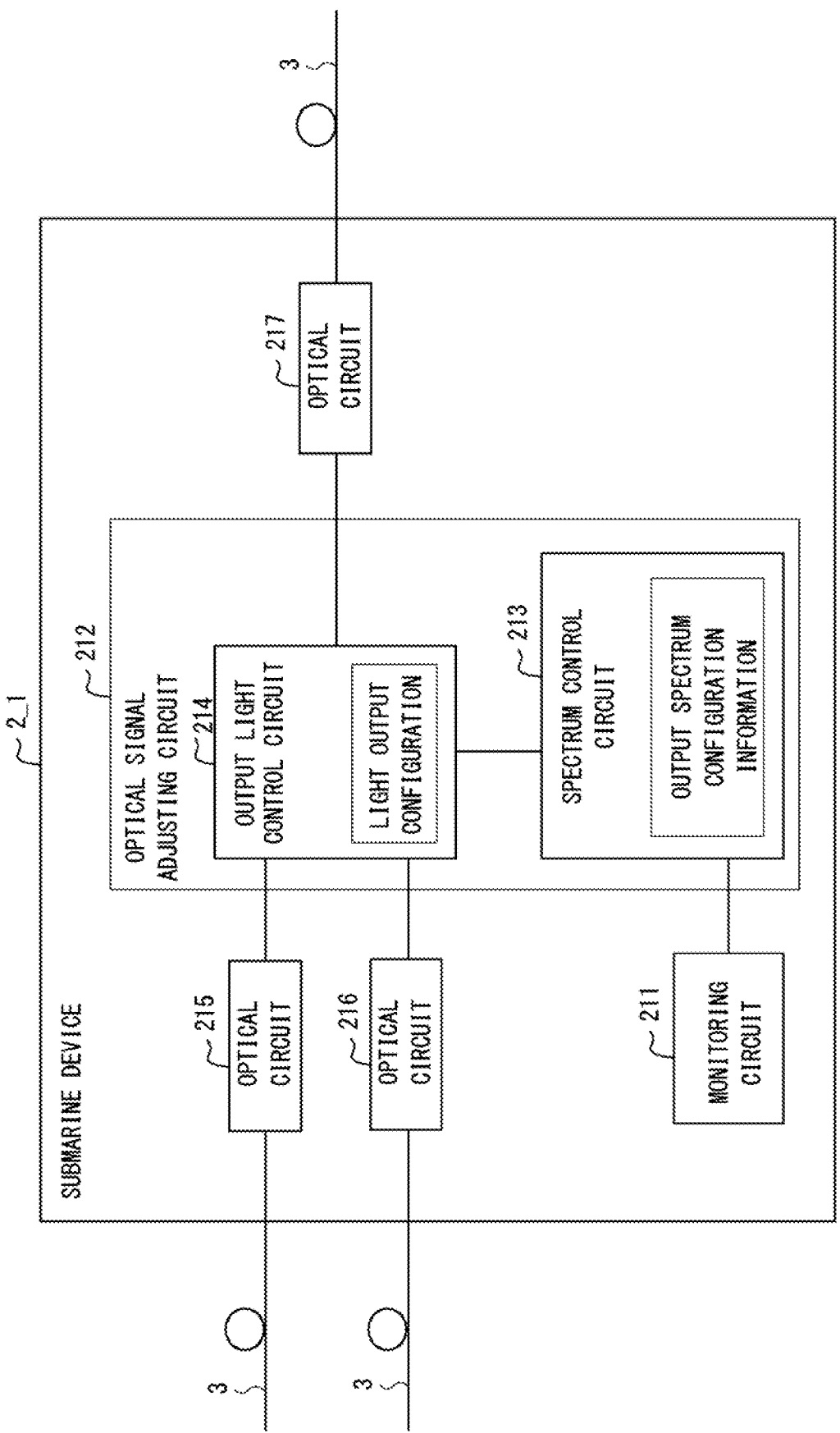
FIG. 2 is a block diagram showing a specific configuration example of a submarine device provided in the submarine optical communication system shown in FIG. 1.

FIG. 2 is a block diagram showing a specific configuration example of the submarine device 2_1.

As shown in FIG. 2, the submarine device 2_1 includes the monitoring circuit 211, the optical signal adjusting circuit 212, and optical circuits 215 to 217. The optical signal adjusting circuit 212 is composed of a spectrum control circuit 213 and an output light control circuit 214.

The output light control circuit 214 has a function as a Wavelength Selectable Switch (WSS) for selecting one of a plurality of optical signals supplied from the plurality of submarine cables 3 of different paths and outputting the selected optical signal. The output light control circuit 214 adjusts the intensity of the optical signal supplied through the submarine cable 3.

As described above, the monitoring circuit 211 monitors the operation state of the submarine device 2_1. The operation state of the submarine device 2_1 includes status information, alarm information, monitor information, and the like of the submarine device 2_1.

The spectrum control circuit 213 controls a spectrum (a wavelength intensity) of the optical signal output from the output light control circuit 214 based on the monitoring result obtained by the monitoring circuit 211. Thus, the output light control circuit 214 adjusts the intensity of the optical signal in the wavelength band assigned to the submarine device 2_1 among the optical signals to the intensity according to the monitoring result obtained by the monitoring circuit 211. An amount of adjustment of the intensity of the optical signal is controlled to such an extent that it does not affect communication quality. However, when there is a possibility that the communication quality deteriorates due to a slight change in the intensity of the optical signal in a predetermined wavelength band, the predetermined wavelength band is excluded from the wavelength band used for transmitting the monitoring result.

Figure 3:
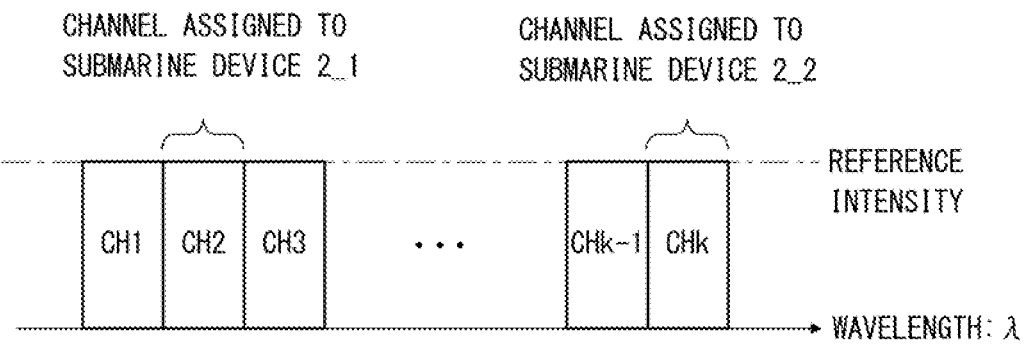
FIG. 3 is a diagram for explaining an optical signal before transmission of a monitoring result of the submarine device obtained by the submarine device provided in the submarine optical communication system shown in FIG. 1.

FIG. 3 is a diagram for explaining the optical signal before the monitoring result of the submarine device 2_1 is transmitted by the submarine device 2_1. Referring to FIG. 3, the optical signal propagating through the submarine cable 3 is, for example, a wavelength multiplexed optical signal composed of optical signals of a plurality of channels CH1 to CHk (k is an integer of two or more).

(First Method of Transmitting the Monitoring Result of the Submarine Device 2_1 Obtained by the Submarine Device 2_1)

Figure 4:
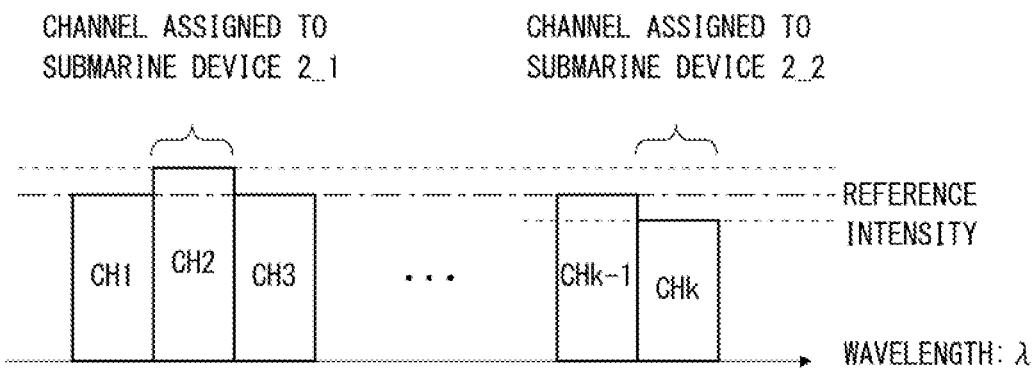
FIG. 4 is a diagram for explaining a first method of transmitting a monitoring result of the submarine device obtained by the submarine device itself provided in the submarine optical communication system shown in FIG. 1.

FIG. 4 is a diagram for explaining a first method of transmitting the monitoring result of the submarine device 2_1 by the submarine device 2_1. Referring to FIG. 4, the output light control circuit 214 adjusts the intensity of the optical signal of the channel CH2 assigned to the submarine device 2_1 among the optical signals based on the monitoring result obtained by the monitoring circuit 211. For example, when there is an abnormality in the submarine device 2_1, the output light control circuit 214 makes the intensity of the optical signal of the channel CH2 weaker than a reference intensity, while when there is no abnormality in the submarine device 2_1, the output light control circuit 214 makes the intensity of the optical signal of the channel CH2 stronger than the reference intensity.

In the example of FIG. 4, the channel CHk is assigned to the submarine device 2_2 as a channel for transmitting the monitoring result. Therefore, the submarine device 2_2 adjusts the intensity of the optical signal of the channel CHk based on the monitoring result obtained by the monitoring circuit 221.

In this way, the submarine devices 2_1 and 2_2 adjust the intensities of the optical signals in different wavelength bands included in the common optical signals based on the respective monitoring results. Thus, in the submarine optical communication system SYS1, each of the submarine devices 2_1 and 2_2 can freely transmit the monitoring result of the submarine devices 2_1 and 2_2, respectively, without worrying about each other's transmission state of the monitoring result.

Note that how the intensity of the optical signal is controlled according to the monitoring result can be configured in any way. For example, when there is no abnormality in the submarine device 2_1, the intensity of the optical signal of the channel CH2 may be maintained at the reference intensity instead of making it stronger than the reference intensity. Alternatively, the intensity of the optical signal of the channel CH2 may be controlled only when a specific abnormality (a failure at a specific location) in the submarine device 2_1 occurs.

(Second Method of Transmitting the Monitoring Result of the Submarine Device 2_1 Obtained by the Submarine Device 2_1)

Figure 5:
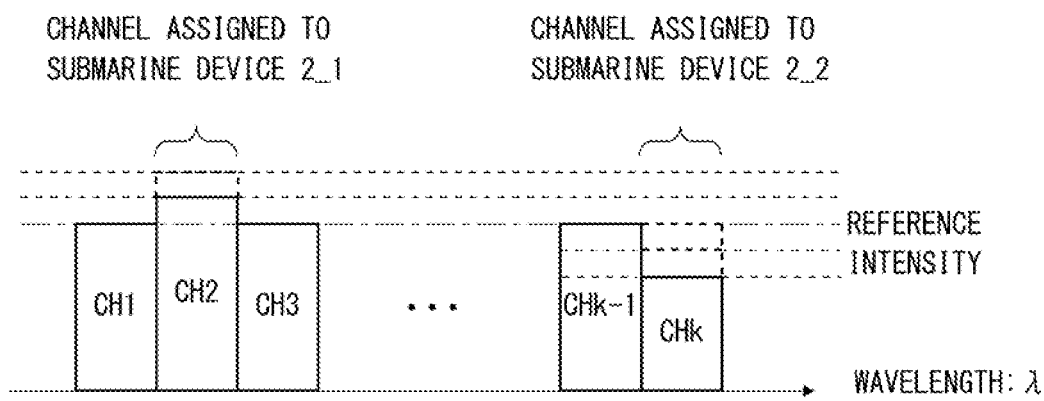
FIG. 5 is a diagram for explaining a second method of transmitting a monitoring result of the submarine device obtained by the submarine device itself provided in the submarine optical communication system shown in FIG. 1.

FIG. 5 is a diagram for explaining a second method of transmitting the monitoring result of the submarine device 2_1 obtained by the submarine device 2_1. Referring to FIG. 5, the output light control circuit 214 adjusts an amount of change of the optical signal of the channel CH2 from the reference intensity based on the monitoring result obtained by the monitoring circuit 211. For example, the output light control circuit 214 adjusts the amount of change of the optical signal of the channel CH2 from the reference intensity based on the status information, the alarm information, and the monitor information of the submarine device 2_1. By doing so, the submarine device 2_1 can collectively transmit a plurality of pieces of information included in the monitoring result obtained by the monitoring circuit 211.

In the example of FIG. 5, the channel CHk is assigned to the submarine device 2_2 as a channel for transmitting the monitoring result. Therefore, the submarine device 2_2 adjusts the amount of change of the optical signal of the channel CHk from the reference intensity based on the monitoring result obtained by the monitoring circuit 221. Thus, the submarine device 2_2 can collectively transmit a plurality of pieces of information included in the monitoring result obtained by the monitoring circuit 221.

In the example shown in FIG. 5, the submarine devices 2_1 and 2_2 adjust the amount of change of the optical signals of the channels CH2 and CHk from the reference intensity based on the monitoring results obtained by the submarine devices 2_1 and 2_2, respectively, but the present disclosure is not limited to this. For example, the submarine devices 2_1 and 2_2 may adjust a period in which the intensities of the optical signals in the wavelength bands of the channels CH2 and CHk are changed based on the monitoring results obtained by the submarine devices 2_1 and 2_2, respectively. In other words, the submarine devices 2_1 and 2_2 may be capable of transmitting notifications about different monitoring results including an alarm or the like depending on a difference in a period of time during which the intensity of the optical signal is changed. For example, if the period of time during which the intensity of the optical signal is changed is 1 second, a first alarm A is indicated, while if the period of time during which the intensity of the optical signal is changed is 2 seconds, a second alarm B is indicated.

(Third Method of Transmitting the Monitoring Result of the Submarine Device 2_1 Obtained by the Submarine Device 2_1)

Figure 6:
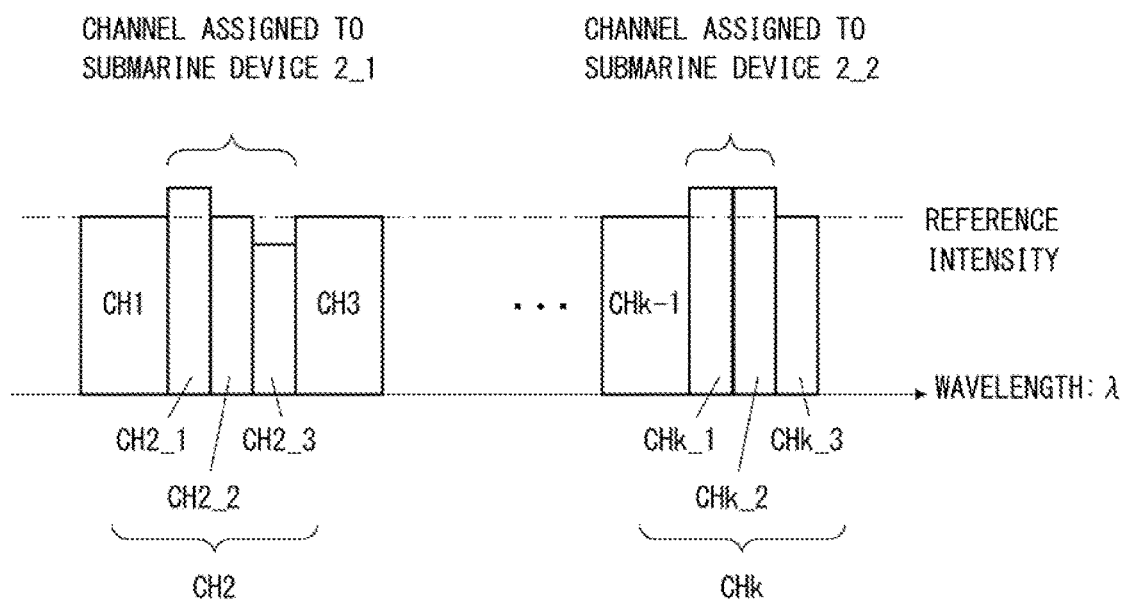
FIG. 6 is a diagram for explaining a third method of transmitting a monitoring result of the submarine device obtained by the submarine device itself provided in the submarine optical communication system shown in FIG. 1.

FIG. 6 is a diagram for explaining a third method of transmitting the monitoring result of the submarine device 2_1 obtained by the submarine device 2_1. Referring to FIG. 6, the channel CH2 assigned to the submarine device 2_1 is composed of a plurality of channels CH2_1 to CH2_3. Here, the output light control circuit 214 adjusts the intensities of the respective optical signals of the channels CH2_1 to CH2_3 based on the monitoring result obtained by the monitoring circuit 211. For example, the output light control circuit 214 adjusts the intensity of the respective optical signals of the channels CH2_1 to CH2_3 based on the status information, the alarm information, and the monitor information of the submarine device 2_1. Thus, the submarine device 2_1 can collectively transmit a plurality of pieces of information included in the monitoring result obtained by the monitoring circuit 211.

In the example of FIG. 6, the channel CHk assigned to the submarine device 2_2 is composed of a plurality of channels CHk_1 to CHk_3. Therefore, the submarine device 2_2 adjusts the intensities of the respective optical signals of the channels CHk_1 to CHk_3 based on, for example, the status information, the alarm information, and the monitor information of the submarine device 2_2. Thus, the submarine device 2_2 can collectively transmit a plurality of pieces of information included in the monitoring result obtained by the monitoring circuit 221.

(Fourth Method of Transmitting the Monitoring Result of the Submarine Device 2_1 Obtained by the Submarine Device 2_1)

Figure 7:
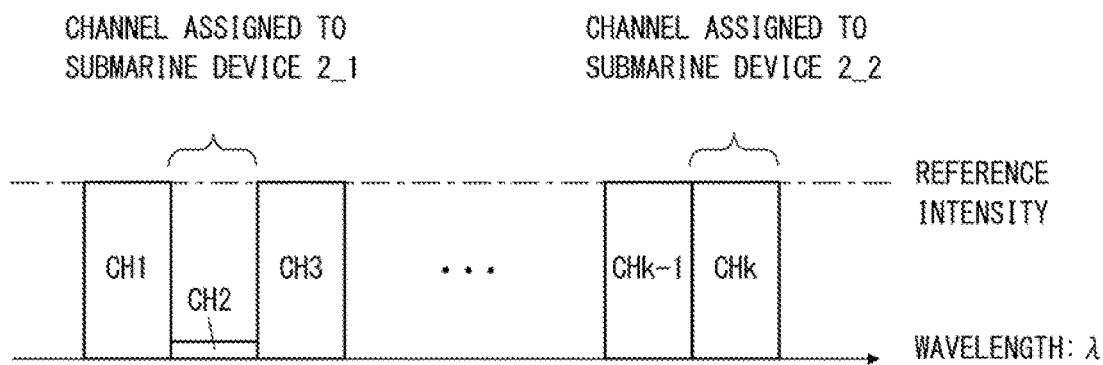
FIG. 7 is a diagram for explaining a fourth method of transmitting a monitoring result of the submarine device obtained by the submarine device itself provided in the submarine optical communication system shown in FIG. 1.

FIG. 7 is a diagram for explaining a fourth method of transmitting the monitoring result of the submarine device 2_1 obtained by the submarine device 2_1. Referring to FIG. 7, the output light control circuit 214 blocks the output of the optical signal of the channel CH2 (i.e., the intensity is made substantially zero), because there is, for example, an abnormality in the submarine device 2_1. In this case, in response to receiving the optical signal, the terminal station apparatus 1_1 causes a transmission apparatus such as SLTE or TPND to generate an LOS (Loss Of Signal) alarm and an LOF (Loss Of Frame) alarm, thereby determining that there is an abnormality in the submarine device 2_1. SLTE stands for Submarine Line Terminal Equipment. TPND stands for TransPoNDer.

In addition, in the example of FIG. 7, the submarine device 2_2 blocks the output of the optical signal of the channel CHk, for example, when there is an abnormality in the submarine device 2_2. In the example of FIG. 7, since no abnormality has occurred in the submarine device 2_2, the output of the optical signal of the channel CHk is not blocked.

In the example of FIG. 7, the submarine devices 2_1 and 2_2 block the output of the optical signals of the channels CH2 and CHk when there is an abnormality in the submarine devices 2_1 and 2_2, respectively, but the present disclosure is not limited to this. The submarine devices 2_1 and 2_2 may block the output of the optical signals of the channels CH2 and CHk when it is necessary to transmit a notification about a specific monitoring result, for example, when an urgent situation occurs. In this case, in response to receiving the optical signal, the terminal station apparatus 1_1 causes the transmission apparatus such as SLTE or TPND to generate an alarm of signal degradation, thereby determining that there is an abnormality in the submarine devices 2_1 and 2_2.

Further, in the example of FIG. 7, the submarine devices 2_1 and 2_2 block the output of the optical signals of the channels CH2 and CHk when there is an abnormality in the submarine devices 2_1 and 2_2, respectively, but the present disclosure is not limited to this. For example, the submarine devices 2_1 and 2_2 may operate levels of the optical signals of the channels CH2 and CHk to deteriorate the communication quality when there is an abnormality in the submarine devices 2_1 and 2_2, respectively. In this case, in response to receiving the optical signal, the terminal station apparatus 1_1 causes the transmission apparatus such as SLTE or TPND to generate an alarm of signal degradation, thereby determining that there is an abnormality in the submarine devices 2_1 and 2_2.

The first to fourth methods of transmitting the monitoring results by the submarine device 2_1 (and 2_2) may be used in combination.

Specific Example of Terminal Station Apparatus 1_1

FIG. 8 is a block diagram showing a specific configuration example of the terminal station apparatus 1_1. In the following descriptions, the management and control of the monitoring results in the terminal station apparatus 1_1 will be described.

As shown in FIG. 8, the terminal station apparatus 1_1 has a function of collecting, managing, and controlling the monitoring results of the submarine device 2_1 and 2_2 obtained by the submarine devices 2_1 and 2_2, respectively. Specifically, the terminal station apparatus 1_1 includes a wavelength multiplexing apparatus 111, a transmission apparatus 112 such as SLTE or TPND, and a system monitoring apparatus 113 for monitoring the entire submarine optical communication system SYS1.

The wavelength multiplexing apparatus 111 may be, for example, a WME (Wavelength Multiplexing Equipment) and may include an optical CouPLer (CPL)) 114, a reception circuit 115, a control and management circuit 116, and an optical circuit 117.

The optical coupler 114 splits the optical signal supplied through the submarine cable 3. One optical signal split by the optical coupler 114 is supplied to the transmission apparatus 112, and the other one of the split optical signal is received by the reception circuit 115.

The reception circuit 115 may include, for example, an Optical Channel Monitor (OCM) 118 to monitor optical power (intensity) of each channel of an optical signal. In other words, the reception circuit 115 extracts the intensities of the optical signals of the channels CH2 and CHk used for transmitting the monitoring results of the submarine devices 2_1 and 2_2 obtained by the submarine devices 2_1 and 2_2, respectively.

The management circuit 116 includes, for example, a determination circuit 119 and a management information storage unit 120. The determination circuit 119 identifies the monitoring results of the submarine devices 2_1 and 2_2 obtained by the submarine devices 2_1 and 2_2, respectively, from the intensities of the optical signals of the channels CH2 and CHk, respectively, extracted by the reception circuit 115. These monitoring results are stored and managed in the management information storage unit 120. Then, predetermined control is performed based on the monitoring results stored in the management information storage unit 120.

As described above, in the submarine optical communication system SYS1 according to this example embodiment, a plurality of submarine devices adjust intensities of optical signals in different wavelength bands included in common optical signals based on respective monitoring results, and output the optical signals including the respective monitoring results. Thus, in the submarine optical communication system SYS1 according to this example embodiment, the plurality of submarine devices can freely transmit the monitoring results of the respective submarine devices without worrying about each other's transmission state of the monitoring result. Thus, for example, a plurality of submarine devices can simultaneously transmit the their monitoring results to the terminal station apparatus. Furthermore, each of the submarine devices can autonomously transmit the monitoring result to the terminal station apparatus without waiting for a command signal from the terminal station apparatus, for example, when a failure occurs in the submarine device itself.

In the above example embodiment, the case where the submarine optical communication system SYS1 includes two submarine devices 2_1 and 2_2 has been described as an example, but the present disclosure is not limited thereto. The submarine optical communication system SYS1 can be suitably changed to a configuration having three or more submarine devices 2_1 to 2_n (n is an integer of three or more).

Although the example embodiment of the present disclosure has been described in detail with reference to the drawings, the specific configuration is not limited to the above, and various design changes and the like are possible within the scope not departing from the gist of the present disclosure.

In the above-described example embodiment, the present disclosure has been described as a hardware configuration, but the present disclosure is not limited thereto. The present disclosure can also be implemented by causing a CPU (Central Processing Unit) to execute a computer program for transmitting the monitoring result in the submarine optical communication system SYS1.

The program can be stored and provided to a computer using any type of non-transitory computer readable media. Non-transitory computer readable media include any type of tangible storage media. Examples of non-transitory computer readable media include magnetic storage media, optical magnetic storage media, CD-ROM (Read Only Memory), CD-R, CD-R/W, and semiconductor memories. Examples of magnetic storage media include floppy disks, magnetic tapes, hard disk drives, etc. Examples of optical magnetic storage media include magneto-optical disks. Examples of semiconductor memories include such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The whole or part of the exemplary embodiment disclosed above can be described as, but not limited to, the following supplementary notes.

(Supplementary note 1)

A submarine optical communication system comprising:
  a plurality of terminal station apparatuses;
  a submarine cable configured to transmit optical signals used for communication between the plurality of terminal station apparatuses; and
  a first submarine device and a second submarine device provided at relay points of the submarine cable, wherein
    the first submarine device comprises:
    a first monitoring circuit configured to monitor an operation state of the first submarine device; and
    a first optical signal adjusting circuit configured to adjust an intensity of an optical signal in a first wavelength band assigned to the first submarine device among the optical signals supplied to the first submarine device based on a first monitoring result obtained by the first monitoring circuit and output the adjusted optical signal as an optical signal including the first monitoring result,
    the second submarine device comprises:
    a second monitoring circuit configured to monitor an operation state of the second submarine device; and
    a second optical signal adjusting circuit configured to adjust an intensity of an optical signal in a second wavelength band assigned to the second submarine device among the optical signals supplied to the second submarine device based on a second monitoring result obtained by the second monitoring circuit and output the adjusted optical signal as an optical signal including the second monitoring result, the second wavelength band being different from the first wavelength band assigned to the first submarine device.

(Supplementary note 2)

The submarine optical communication system according to Supplementary note 1, wherein
  the first optical signal adjusting circuit is configured to adjust an amount of change of the optical signal in the first wavelength band from a reference intensity based on the first monitoring result obtained by the first monitoring circuit, and
  the second optical signal adjusting circuit is configured to adjust an amount of change of the optical signal in the second wavelength band from a reference intensity based on the second monitoring result obtained by the second monitoring circuit.

(Supplementary note 3)

The submarine optical communication system according to Supplementary note 1 or 2, wherein
  the first wavelength band is composed of a plurality of first partial wavelength bands,
  the second wavelength band is composed of a plurality of second partial wavelength bands,
  the first optical signal adjusting circuit is configured to adjust the intensities of the optical signals in the plurality of first partial wavelength bands based on the first monitoring result obtained by the first monitoring circuit, and
  the second optical signal adjusting circuit is configured to adjust the intensities of the optical signals in the plurality of second partial wavelength bands based on the second monitoring result obtained by the second monitoring circuit.

(Supplementary note 4)

The submarine optical communication system according to any one of Supplementary notes 1 to 3, wherein
  the first optical signal adjusting circuit is configured to block an output of the optical signal in the first wavelength band assigned to the first submarine device based on the first monitoring result showing a specific monitoring result, and
  the second optical signal adjusting circuit is configured to block the output of the optical signal in the second wavelength band assigned to the second submarine device based on the second monitoring result indicating a specific monitoring result.

(Supplementary note 5)

The submarine optical communication system according to any one of Supplementary notes 1 to 4, wherein
  the first optical signal adjusting circuit is configured to exclude a predetermined frequency band from a target of the first wavelength band assigned to the first submarine device, and
  the second optical signal adjusting circuit is configured to exclude a predetermined frequency band from a target of the second wavelength band assigned to the second submarine device.

(Supplementary note 6)

The submarine optical communication system according to any one of Supplementary notes 1 to 5, wherein
  at least one of the plurality of terminal station apparatuses comprises:
    a monitoring result acquisition circuit configured to acquire the first monitoring result from the intensity of the optical signal in the first wavelength band and extract the second monitoring result from the intensity of the optical signal in the second wavelength band; and a management circuit configured to manage the monitoring results extracted by the monitoring result acquisition circuit.

(Supplementary note 7)

A method of transmitting a monitoring result comprising:

a first monitoring step of monitoring, in a first submarine device, an operation state of the first submarine device;

a second monitoring step of monitoring, in a second submarine device, an operation state of the second submarine device;

a first optical signal adjusting step of adjusting, in the first submarine device, an intensity of an optical signal in a first wavelength band assigned to the first submarine device among optical signals supplied to the first submarine device based on a first monitoring result obtained in the first monitoring step and outputting the adjusted optical signal as an optical signal including the first monitoring result; and a second optical signal adjusting step of adjusting, in the second submarine device, an intensity of an optical signal in a second wavelength band assigned to the second submarine device among the optical signals supplied to the second submarine device based on a second monitoring result obtained in the second monitoring step and outputting the adjusted optical signal as an optical signal including the second monitoring result, the second wavelength band being different from the first wavelength band assigned to the first submarine device.

(Supplementary note 8)

The method according to Supplementary note 7, wherein in the first optical signal adjusting step, in the first submarine device, an amount of change of the optical signal in the first wavelength band from a reference intensity is adjusted based on the first monitoring result, and in the second optical signal adjusting step, in the second first submarine device, an amount of change of the optical signal in the second wavelength band from a reference intensity is adjusted based on the second monitoring result.

(Supplementary note 9)

The method according to Supplementary note 7 or 8, wherein the first wavelength band is composed of a plurality of first partial wavelength bands, the second wavelength band is composed of a plurality of second partial wavelength bands, in the first optical signal adjusting step, in the first submarine device, the intensities of the optical signals in the plurality of first partial wavelength bands are adjusted based on the first monitoring result obtained by the first monitoring circuit, and in the second optical signal adjusting step, in the second submarine device, the intensities of the optical signals in the plurality of second partial wavelength bands are adjusted based on the second monitoring result obtained by the second monitoring circuit.

(Supplementary note 10)

The method according to any one of Supplementary notes 7 to 9, wherein in the first optical signal adjusting step, in the first submarine device, an output of the optical signal in the first wavelength band assigned to the first submarine device is blocked based on the first monitoring result showing a specific monitoring result, and in the second optical signal adjusting step, in the second submarine device, an output of the optical signal in the second wavelength band assigned to the second submarine device is blocked based on the second monitoring result showing a specific monitoring result.

(Supplementary note 11)

The method according to any one of Supplementary notes 7 to 10, wherein in the first optical signal adjusting step, in the first submarine device, a predetermined frequency band is excluded from a target of the first wavelength band assigned to the first submarine device, and in the second optical signal adjusting step, in the second submarine device, a predetermined frequency band is excluded from a target of the second wavelength band assigned to the second submarine device.

(Supplementary note 12)

The method according to any one of Supplementary notes 7 to 11, wherein the first submarine device and the second submarine device are both provided at relay points of a submarine cable.

(Supplementary note 13)

A program for causing a computer to execute:

a first monitoring process of monitoring, in a first submarine device, an operation state of the first submarine device;

a second monitoring process of monitoring, in a second submarine device, an operation state of the second submarine device;

a first optical signal adjusting process of adjusting, in the first submarine device, an intensity of an optical signal in a first wavelength band assigned to the first submarine device among optical signals supplied to the first submarine device based on a first monitoring result obtained in the first monitoring process and outputting the adjusted optical signal as an optical signal including the first monitoring result; and a second optical signal adjusting process of adjusting, in the second submarine device, an intensity of an optical signal in a second wavelength band assigned to the second submarine device among the optical signals supplied to the second submarine device based on a second monitoring result obtained in the second monitoring process and outputting the adjusted optical signal as an optical signal including the second monitoring result, the second wavelength band being different from the first wavelength band assigned to the first submarine device.

Although the present disclosure has been described with reference to the above example embodiment, the present disclosure is not limited thereto. Various changes can be made to the configuration and details of the disclosure within the scope of the disclosure that can be understood by those skilled in the art.

This application is based upon and claims the benefit of priority from Japanese patent application No. 2019-164280, filed on Sep. 10, 2019, the disclosure of which is incorporated herein in its entirety by reference.

REFERENCE SIGNS LIST

SYS1 SUBMARINE OPTICAL COMMUNICATION SYSTEM
1, 1_1 TO 1_4 TERMINAL STATION APPARATUS
2, 2_1, 2_2 SUBMARINE DEVICE
3 SUBMARINE CABLE
211 MONITORING CIRCUIT
212 OPTICAL SIGNAL ADJUSTING CIRCUIT
213 SPECTRUM CONTROL CIRCUIT
214 OUTPUT LIGHT CONTROL CIRCUIT
215 TO 217 OPTICAL CIRCUIT
221 MONITORING CIRCUIT

222 OPTICAL SIGNAL ADJUSTING CIRCUIT
111 WAVELENGTH MULTIPLEXING CIRCUIT
112 TRANSMISSION APPARATUS
113 SYSTEM MONITORING CIRCUIT
114 OPTICAL COUPLER
115 RECEPTION CIRCUIT
116 MANAGEMENT CIRCUIT
117 OPTICAL CIRCUIT
118 OPTICAL CHANNEL MONITOR
119 DETERMINATION CIRCUIT
120 MANAGEMENT INFORMATION STORAGE UNIT

What is claimed is:

1. A submarine optical communication system comprising:
a plurality of terminal station apparatuses;
a submarine cable configured to transmit optical signals used for communication between the plurality of terminal station apparatuses; and
a first submarine device and a second submarine device provided at relay points of the submarine cable, wherein
the first submarine device comprises:
a first monitoring circuit configured to autonomously monitor an operation state of the first submarine device; and
a first optical signal adjusting circuit configured to adjust an intensity of an optical signal in a first wavelength band assigned to the first submarine device among the optical signals supplied to the first submarine device based on a first monitoring result obtained by the first monitoring circuit and output the adjusted optical signal as an optical signal including the first monitoring result,
the second submarine device comprises:
a second monitoring circuit configured to autonomously monitor an operation state of the second submarine device; and
a second optical signal adjusting circuit configured to adjust an intensity of an optical signal in a second wavelength band assigned to the second submarine device among the optical signals supplied to the second submarine device based on a second monitoring result obtained by the second monitoring circuit and output the adjusted optical signal as an optical signal including the second monitoring result, the second wavelength band being different from the first wavelength band assigned to the first submarine device.

2. The submarine optical communication system according to claim 1, wherein
the first optical signal adjusting circuit is configured to adjust an amount of change of the optical signal in the first wavelength band from a reference intensity based on the first monitoring result obtained by the first monitoring circuit, and
the second optical signal adjusting circuit is configured to adjust an amount of change of the optical signal in the second wavelength band from a reference intensity based on the second monitoring result obtained by the second monitoring circuit.

3. The submarine optical communication system according to claim 1, wherein
the first wavelength band is composed of a plurality of first partial wavelength bands,
the second wavelength band is composed of a plurality of second partial wavelength bands,
the first optical signal adjusting circuit is configured to adjust intensities of the optical signals in the plurality of first partial wavelength bands based on the first monitoring result obtained by the first monitoring circuit, and
the second optical signal adjusting circuit is configured to adjust intensities of the optical signals in the plurality of second partial wavelength bands based on the second monitoring result obtained by the second monitoring circuit.

4. The submarine optical communication system according to claim 1, wherein
the first optical signal adjusting circuit is configured to block an output of the optical signal in the first wavelength band assigned to the first submarine device based on the first monitoring result indicating a first specific monitoring result, and
the second optical signal adjusting circuit is configured to block the output of the optical signal in the second wavelength band assigned to the second submarine device based on the second monitoring result indicating a second specific monitoring result.

5. The submarine optical communication system according to claim 1, wherein
the first optical signal adjusting circuit is configured to exclude a predetermined frequency band from a target of the first wavelength band assigned to the first submarine device, and
the second optical signal adjusting circuit is configured to exclude a predetermined frequency band from a target of the second wavelength band assigned to the second submarine device.

6. The submarine optical communication system according to claim 1, wherein
at least one of the plurality of terminal station apparatuses comprises:
a monitoring result acquisition circuit configured to acquire the first monitoring result from the intensity of the optical signal in the first wavelength band and extract the second monitoring result from the intensity of the optical signal in the second wavelength band; and
a management circuit configured to manage the first and the second monitoring results extracted by the monitoring result acquisition circuit, and
the monitoring result acquisition circuit comprises:
an optical coupler configured to split the optical signal supplied through the submarine cable;
a transmission apparatus to which one optical signal split by the optical coupler is supplied, the transmission apparatus being at least one of SLTE (Submarine Line Terminal Equipment) and TPND (Transponder); and
a reception apparatus configured to receive another one of the split optical signal split by the optical coupler, and
the reception apparatus includes an optical channel monitor configured to extract, as the monitoring results obtained by the first and second submarine devices, intensities of the optical signals of channels used for transmitting the first and the second monitoring results.

7. A method of transmitting a monitoring result comprising:
monitoring, in a first submarine device, an operation state of the first submarine device;
monitoring, in a second submarine device, an operation state of the second submarine device;

adjusting, in the first submarine device, an intensity of an optical signal in a first wavelength band assigned to the first submarine device among optical signals supplied to the first submarine device based on a first monitoring result autonomously obtained by the first submarine device and outputting the adjusted optical signal as an optical signal including the first monitoring result; and adjusting, in the second submarine device, an intensity of an optical signal in a second wavelength band assigned to the second submarine device among the optical signals supplied to the second submarine device based on a second monitoring result autonomously obtained by the second submarine device and outputting the adjusted optical signal as an optical signal including the second monitoring result, the second wavelength band being different from the first wavelength band assigned to the first submarine device.

8. The method according to claim 7, wherein in the adjustment of the intensity of the optical signal in the first wavelength band, in the first submarine device, an amount of change of the optical signal in the first wavelength band from a reference intensity is adjusted based on the first monitoring result, and in the adjustment of the intensity of the optical signal in the second wavelength band, in the second submarine device, an amount of change of the optical signal in the second wavelength band from a reference intensity is adjusted based on the second monitoring result.

9. The method according to claim 7, wherein the first wavelength band is composed of a plurality of first partial wavelength bands, the second wavelength band is composed of a plurality of second partial wavelength bands, in the adjustment of the intensity of the optical signal in the first wavelength band, in the first submarine device, intensities of the optical signals in the plurality of first partial wavelength bands are adjusted based on the first monitoring result autonomously obtained by the first submarine device, and in the adjustment of the intensity of the optical signal in the second wavelength band, in the second submarine device, intensities of the optical signals in the plurality of second partial wavelength bands are adjusted based on the second monitoring result autonomously obtained by the second submarine device.

10. The method according to claim 7, wherein in the adjustment of the intensity of the optical signal in the first wavelength band, in the first submarine device, an output of the optical signal in the first wavelength band assigned to the first submarine device is blocked based on the first monitoring result indicating a first specific monitoring result, and in the adjustment of the intensity of the optical signal in the second wavelength band, in the second submarine device, an output of the optical signal in the second wavelength band assigned to the second submarine device is blocked based on the second monitoring result indicating a second specific monitoring result.

11. The method according to claim 7, wherein in the adjustment of the intensity of the optical signal in the first wavelength band, in the first submarine device, a predetermined frequency band is excluded from a target of the first wavelength band assigned to the first submarine device, and in the adjustment of the intensity of the optical signal in the second wavelength band, in the second submarine device, a predetermined frequency band is excluded from a target of the second wavelength band assigned to the second submarine device.

12. The method according to claim 7, wherein the first submarine device and the second submarine device are both provided at relay points of a submarine cable.

13. A non-transitory computer readable medium storing a program for causing a computer to execute:

a first monitoring process of autonomously monitoring, in a first submarine device, an operation state of the first submarine device;

a second monitoring process of autonomously monitoring, in a second submarine device, an operation state of the second submarine device;

a first optical signal adjusting process of adjusting, in the first submarine device, an intensity of an optical signal in a first wavelength band assigned to the first submarine device among optical signals supplied to the first submarine device based on a first monitoring result obtained in the first monitoring process and outputting the adjusted optical signal as an optical signal including the first monitoring result; and a second optical signal adjusting process of adjusting, in the second submarine device, an intensity of an optical signal in a second wavelength band assigned to the second submarine device among the optical signals supplied to the second submarine device based on a second monitoring result obtained in the second monitoring process and outputting the adjusted optical signal as an optical signal including the second monitoring result, the second wavelength band being different from the first wavelength band assigned to the first submarine device.

* * * * *